(12) United States Patent
Keatley

(10) Patent No.: US 9,656,702 B2
(45) Date of Patent: May 23, 2017

(54) FIFTH WHEEL HITCH SUPPORT ASSEMBLY

(71) Applicant: SAF-HOLLAND, Inc., Holland, MI (US)

(72) Inventor: Justin D. Keatley, Zeeland, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 380 days.

(21) Appl. No.: 14/445,739

(22) Filed: Jul. 29, 2014

(65) Prior Publication Data

US 2015/0008658 A1    Jan. 8, 2015

Related U.S. Application Data

(63) Continuation-in-part of application No. 13/667,660, filed on Nov. 2, 2012, now Pat. No. 8,801,036.

(60) Provisional application No. 61/556,568, filed on Nov. 7, 2011.

(51) Int. Cl.
*B62D 53/08* (2006.01)
*B62D 21/05* (2006.01)
*B62D 21/09* (2006.01)
*B60D 1/44* (2006.01)
*B60D 1/01* (2006.01)
(Continued)

(52) U.S. Cl.
CPC ......... *B62D 53/0807* (2013.01); *B60D 1/015* (2013.01); *B60D 1/44* (2013.01); *B60D 1/488* (2013.01); *B62D 21/02* (2013.01); *B62D 21/05* (2013.01); *B62D 21/09* (2013.01); *B62D 53/08* (2013.01); *B62D 53/0814* (2013.01); *Y10T 29/49492* (2015.01)

(58) Field of Classification Search
CPC .... B62D 53/0807; B62D 21/05; B62D 21/09; B62D 21/02; B62D 53/0814; B62D 53/08; B60D 1/44; B60D 1/488; B60D 1/015
USPC ............ 280/438.1, 407, 433, 441, 781, 495
See application file for complete search history.

(56) References Cited

U.S. PATENT DOCUMENTS 3,606,384 A * 9/1971 Fontaine et al. ... B62D 53/0807
280/149.2
4,443,025 A * 4/1984 Martin ............... B62D 53/0807
280/407
(Continued)

FOREIGN PATENT DOCUMENTS

CH    DE 3330074 A1 *  3/1984  ......... B62D 53/0807

*Primary Examiner* — Joseph Rocca
*Assistant Examiner* — Daniel Yeagley
(74) *Attorney, Agent, or Firm* — Price Heneveld LLP

(57) ABSTRACT

A fifth wheel mounting assembly comprises first and second support members adapted to couple to frame members and support assembly that comprises first and second portions slidably engaging the first and second support members and adjustable along a length thereof, the first and second portions including an upwardly-opening recess, first and second mounting members coupled to the first and second portions and configured to pivotably support the fifth wheel hitch plate, and a center portion having a first and second end received within the recesses of the first and second portions, wherein the recesses of the first and second portions are configured to receive the ends of the center portion subsequent to the first mounting member being coupled to the first mounting portion and the second mounting member being coupled to the second mounting portion.

19 Claims, 10 Drawing Sheets

(51) Int. Cl.
  *B60D 1/48*  (2006.01)
  *B62D 21/02*  (2006.01)

(56) References Cited

U.S. PATENT DOCUMENTS

| | | | |
|---|---|---|---|
| 7,100,933 B2* | 9/2006 | Zackovich | B60P 3/12 |
| | | | 280/402 |
| 8,801,036 B2 | 8/2014 | Keatley | |
| 2004/0021290 A1* | 2/2004 | Hicks | B60G 9/00 |
| | | | 280/438.1 |

* cited by examiner

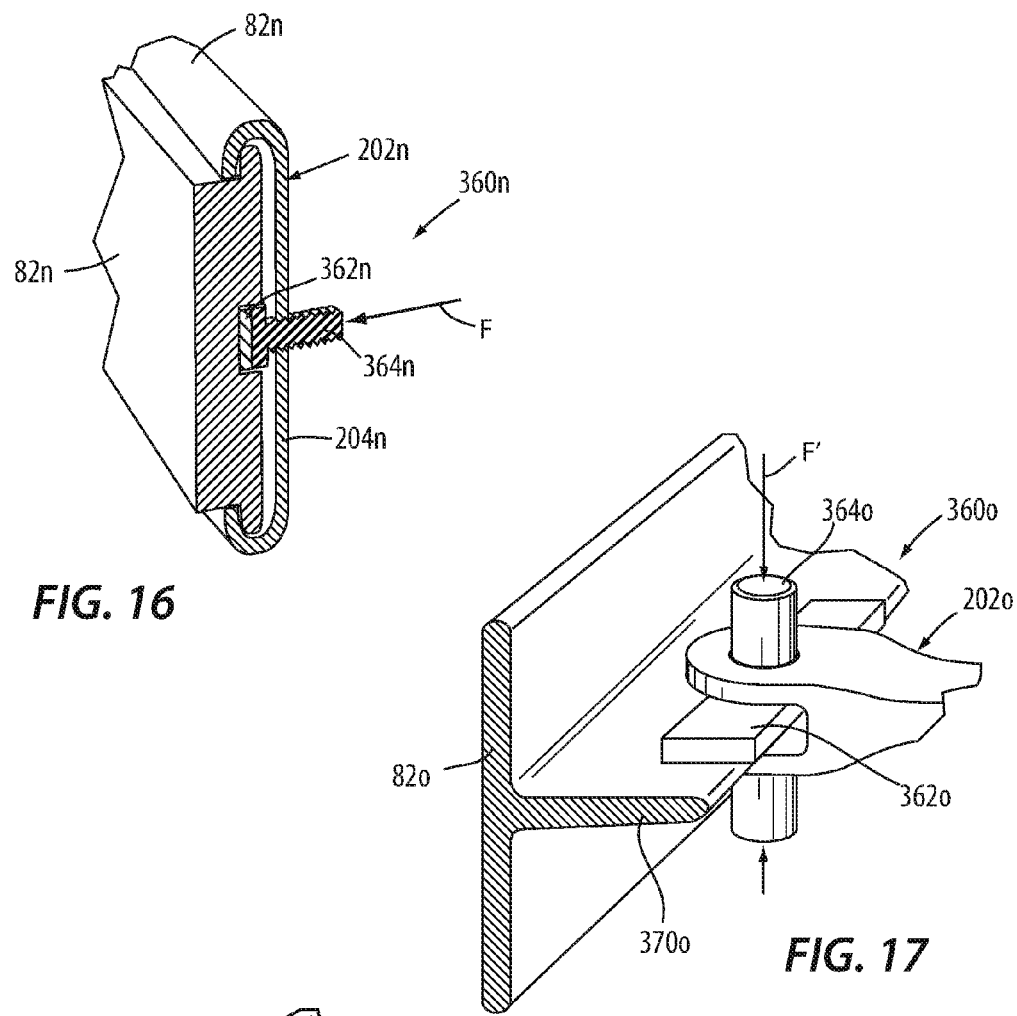
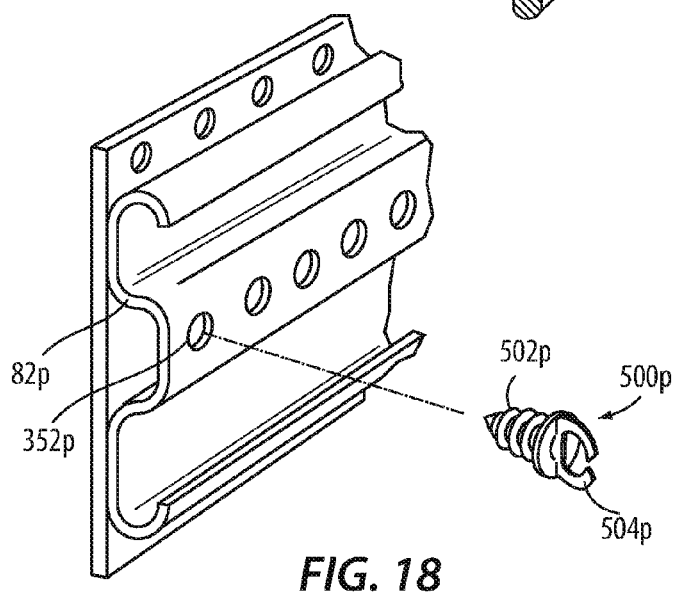
FIG. 18

FIFTH WHEEL HITCH SUPPORT ASSEMBLY

CROSS REFERENCE TO RELATED APPLICATIONS

This application is a continuation-in-part of U.S. patent application Ser. No. 13/667,660, filed on Nov. 2, 2012, entitled "FIFTH WHEEL HITCH SUPPORT ASSEMBLY," the entire disclosures of which are incorporated herein by reference.

BACKGROUND OF THE INVENTION

The present invention relates to a fifth wheel mounting assembly and in particular to a novel mounting and arrangement to support various vehicle component arrangements from a vehicle frame assembly and allowing assembly of the vehicle component arrangements prior to attachment of the vehicle components to the vehicle frame assembly at variably selectable position along a length of the vehicle frame assembly.

Fifth wheel coupling systems are used in a wide variety of applications for coupling heavy duty trailers to associated tractors, as well as for coupling recreational vehicles with associated towing vehicles. FIG. 1 illustrates a typical prior construction of a tractor frame and a fifth wheel mounting system 10 for tractor/trailer applications. As illustrated, the tractor frame and mounting system 10 includes a pair of parallel frame rails 12 spaced apart and supported by a suspension 14, and supporting a drive train (not shown) and a fifth wheel coupling apparatus 16 for connecting a trailer to the tractor. While the frame rails 12 are illustrated as ending under a deck 17 it is noted that in the instant example the rails 12 continue forwardly of the deck 17 and extend under a cab of the tractor and support the cab and an engine of the tractor. It is further noted that the overall tractor assembly is utilized for illustrative purposes only, and that the present inventive assembly may also be incorporated into trailer assemblies.

The coupling apparatus 16 includes a fifth wheel hitch plate 20 and a mounting bracket and base plate assembly 18 configured to connect the fifth wheel hitch plate 20 to the frame rails 12. The mounting bracket and base plate assembly 18 includes a pair of brackets 22 connected to ends of a base plate 24. The base plate 24 is constructed of a planar sheet of steel that includes a pair of mounting brackets 26 extending upwardly from a top surface of the base plate 24. As illustrated, the mounting brackets 26 are fixedly welded to the base plate 24, while the base plate 24 is fixedly welded to the brackets 22. The coupling apparatus 16 is connected to the frame rails 12 by placing ends of the base plate 24 over the top surface of the frame rails 12 and by inserting fasteners (not shown) through the brackets 22 and into the frame rails 12. Therefore, the brackets 22 assist in connecting the coupling apparatus 16 to the frame rails 12 of the tractor. Each mounting bracket 26 of the mounting bracket and base plate assembly 18 includes an elongated aperture 28 therein configured to accept conventional attachment structure (not shown) for connecting the fifth wheel hitch plate 20 to the base plate 24. A separate cross-frame member 30 is located beneath the base plate 24 and extends between the frame rails 12, thereby structurally supporting the base plate 24 and the frame rails 12. Prior art systems like this and others requires the base plate or cross member 24 to be coupled to the attachment of the mounting bracket 26 thereby requiring the overall dimensions of the assembly to be customized for each and every application of the various spacing between the frame rails currently in wide use.

Accordingly, a fifth wheel mounting assembly is provided that decreases construction and assembly costs, while simultaneously reducing the weight and overall complexity of the assembly, and further allowing for the support of various vehicle component arrangements from a single, adjustable support platform.

SUMMARY OF THE INVENTION

One aspect of the present invention is to provide a fifth wheel mounting assembly for mounting a fifth wheel hitch plate to a vehicle frame assembly including a first frame member and a second frame member, the fifth wheel mounting assembly comprising a first support member adapted to couple to the first frame member of the vehicle frame assembly, a second support member adapted to couple to the second frame member of a vehicle frame assembly, and a support assembly. The support assembly includes a first portion slidably engaging the first support member and adjustable along a length of the first support member, wherein the first portion includes an upwardly-opening recess, a first mounting member coupled to the first portion and configured to pivotably support the fifth wheel hitch plate, a second portion slidably engaging the second support member and adjustable along a length of the second support member, wherein the second portion includes an upwardly-opening recess, a second mounting member coupled to the second portion and configured to pivotably support the fifth wheel hitch plate, and a center portion. The center portion includes a first end received within the upwardly-opening recess of the first portion and second end received within the upwardly-opening recess of the first portion and the upwardly-opening recess of the second portion are configured to receive the ends of the cross member subsequent to the first mounting member being coupled to the first mounting portion and the second mounting member being coupled to the second mounting portion.

Another aspect of the present invention is to provide a fifth wheel mounting assembly for mounting a fifth wheel hitch plate to a vehicle frame assembly including a first frame member and a second frame member, the fifth wheel mounting assembly comprising a first support member adapted to couple to the first frame member of the vehicle frame assembly, a second support member adapted to couple to the second frame member of a vehicle frame assembly, and a support assembly. The support assembly includes a first portion slidably engaging the first support member and adjustable along a length of the first support member, wherein the first portion includes an upwardly-opening recess, a first mounting member coupled to the first portion and configured to pivotably support the fifth wheel hitch plate, a second portion slidably engaging the second support member and adjustable along a length of the second support member, wherein the second portion includes an upwardly-opening recess, a second mounting member coupled to the second portion and configured to pivotably support the fifth wheel hitch plate, and a center portion. The center portion includes a first end received within the upwardly-opening recess of the first portion and second end received within the upwardly-opening recess of the second portion, wherein the first mounting member is inwardly-horizontally spaced from the first end of the center portion and the second mounting member is inwardly-horizontally spaced from the second end of the center portion.

Another aspect of the present invention is to provide a method for mounting a fifth wheel mounting assembly to a vehicle frame assembly that includes a first frame member and a second frame member, the method comprising providing a first support member, coupling the first support member to the first frame member of the vehicle frame assembly, providing a second support member, and coupling the second support member to the second frame member of a vehicle frame assembly. The method also comprises providing a support assembly that includes a first portion that slidably engages the first support member and is adjustable along a length of the first support member and includes a first recess, the first portion including an upwardly-opening recess, a second portion that slidably engages the second support member and is adjustable along a length of the second support member and includes a second recess, and a center porting having a first end and a second end. The method further comprises coupling a first mounting member to the first portion, the first mounting member configured to pivotably support a fifth wheel hitch plate, coupling a second mounting member to the second portion, the second mounting member configured to pivotably support the fifth wheel hitch plate, coupling the center portion of the support assembly with the first portion of the cross member by positioning the first end of the center portion within the first recess subsequent to the first mounting member being coupled to the first portion, and coupling the center portion of the support assembly with the second portion of the cross member by positioning the second end of the center portion within the second recess subsequent to the second mounting member being coupled to the second portion.

Yet another aspect of the present invention is to provide a heavy duty vehicle accessory mounting assembly for mounting a heavy duty vehicle accessory to a vehicle frame assembly including a first frame member and a second frame member extending substantially parallel with the first frame member, the mounting assembly comprising a first support member adapted to couple to the first frame member of the vehicle assembly, a second support member adapted to couple to the second frame member of a vehicle frame assembly, and a support assembly. The support assembly includes a first portion slidably positionable along a length of the first support member, and selectively engaging the first support member to lock the first portion at a selected position along the length of the first support member, a second portion slidably positionable along a length of the second support member, and selectively engaging the second support member to lock the second portion at a selected position along the length of the second support member, and a center portion. The center portion includes a first end coupled to the first portion and a second end coupled to the second portion, wherein the first end of the center portion is adapted to couple with the first portion subsequent to the first portion being positioned along the length of the first support portion, and wherein the second end of the center portion is adapted to couple with the second portion subsequent to the second portion being positioned along the length of the second support portion. The mounting assembly further includes a vehicle accessory arrangement coupled to the support assembly.

Still yet another aspect of the present invention is to provide a method for mounting a heavy duty vehicle accessory to a vehicle frame assembly including, the method comprising providing a first vehicle frame member, providing a second vehicle frame member extending substantially parallel with the first vehicle frame member, providing a first support member, coupling the first support member to the first frame member, providing a second support member, and coupling the second support member to the second frame member. The method further includes providing a support assembly that includes a first portion slidably positionable along a length of the first support member, a second portion slidably positionable along a length of the second support member, and a center portion having a first end and a second end, positioning the first portion of the support assembly along the length of the first support member to a first selected position, locking the first portion to the first support member at the first selected position, positioning the second portion of the support assembly along the length of the second support member to a second selected position; and locking the second portion to the second support member at the second selected position. The method still further includes coupling the first end of the center portion of the support assembly to the first portion subsequent to positioning the first portion along the length of the first support member, coupling the second end of the center portion of the support assembly to the second portion subsequent to positioning the second portion along the length of the second support member, providing a vehicle accessory arrangement, and coupling a vehicle accessory arrangement to the support assembly.

The present objects of the present invention are to provide a durable fifth wheel mounting assembly that includes an uncomplicated design that can be easily and quickly assembled, thereby reducing the associated manufacturing costs. The present inventive fifth wheel mounting assembly is economical to manufacture, results in a significant reduction of weight, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 16 is an end view of an alternative embodiment of the locking assembly;

FIG. 17 is an end view of another alternative embodiment of the locking assembly; and FIG. 18 is an exploded perspective view of a push-in clip and associated support rail.

DETAILED DESCRIPTION OF THE PREFERRED EMBODIMENTS

Figure 1:
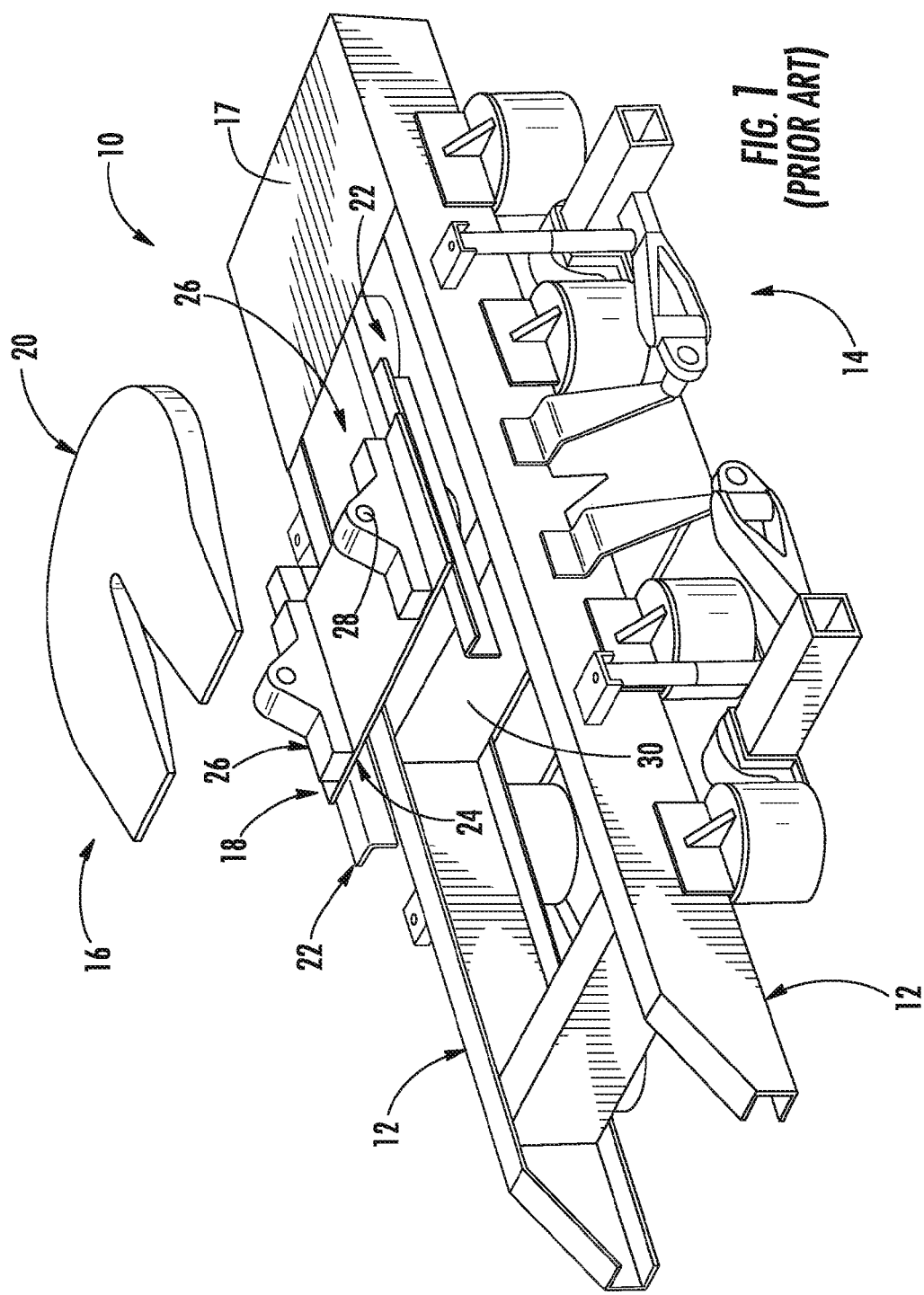
FIG. 1 is an exploded perspective view of a prior art fifth wheel mounting system.
Figure 2:
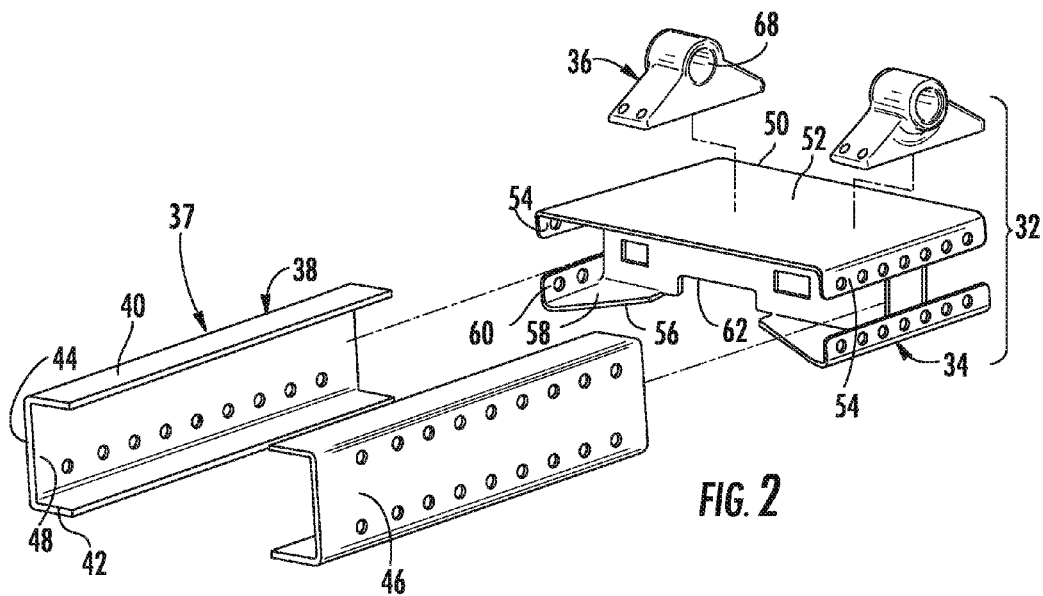
FIG. 2 is an exploded view of a first embodiment of a fifth wheel mounting assembly embodying the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 32 (FIGS. 2 and 3) generally designates a fifth wheel mounting assembly illustrating one embodiment of the present invention. In the illustrated example, the fifth wheel mounting assembly 32 includes a carriage assembly 34 supporting a pair of mounting brackets 36 from a pair of vehicle frame rails 38 of a vehicle frame assembly 37. Each of the vehicle frame rails 38 is provided a C-shaped cross-sectional configuration and includes an upper horizontal portion 40, a lower horizontal portion 42 and a vertical portion 44 extending between and connecting the upper horizontal portion 40 and the lower horizontal portion 42. Each vertical portion 44 includes an outwardly facing surface 46 and an inwardly facing surface 48.

The carriage assembly 34 includes an upper support member 50 having a planar mounting portion 52 and a pair of downwardly extending flanges 54 located at each edge of the mounting portion 52. The carriage assembly 34 further includes a pair of lower support members 56 each including an inwardly extending mounting portion 58 and an upwardly extending flange 60. The carriage assembly 34 further includes a cross-member 62 extending laterally between the frame rails 38 and secured to the upper support member 50 and the lower support members 56. The flanges 54 of the upper support member 50 and the flanges 60 of the lower support members 56 each include a plurality of longitudinally spaced apertures 64 that align with apertures 66 longitudinally spaced along the frame rails 38 and that are adapted to receive mechanical fasteners (not shown) therein, thereby securing the carriage assembly 34 to the inwardly facing surface 48 of each of the frame rails 38. The mounting brackets 36 are secured to an upper surface of the mounting portion 52 of the upper support member 50. Each mounting bracket 36 includes an inwardly exposed aperture 68 adapted to receive a mounting pin therein, so as to pivotally mount a fifth wheel hitch plate (not shown) to the carriage assembly 34.

The reference numeral 32a (FIG. 4) generally designates another embodiment of the present invention. Since the fifth wheel mounting assembly 32a is similar to the previously described fifth wheel mounting assembly 32, similar parts appearing in FIGS. 2 and 3 and FIG. 4 respectively are represented by the same, corresponding reference numeral, except for the suffix "a" in the numerals of the latter. The fifth wheel mounting assembly 32a is similar to the fifth wheel mounting assembly 32 with the most notable exception being the replacement of the upper support member 50 with a pair of upper support members 70 each including a mounting portion 72 and a downwardly extending flange 74. In assembly, the mounting brackets 36a are secured to an upper surface of the mounting portion 72 of the respective upper support member 70. In the illustrated example, the mounting portion 58a of each of the lower support members 56a and the mounting portion 72 of each of the upper support members 70 are each provided with three rows of longitudinally spaced apertures 76 that receive mounting bolts 78 therein, thereby securing the lower support members 56 and the upper support members 70 to the cross member 62a. The offset nature of each of the rows of apertures 76 allows the adjustment of each of the lower support members 56a and the upper support members 70 in a fore and aft direction 79 with respect to the associated cross member 62a along reconfiguration of the carriage assembly 34a for particular applications.

Figure 4:
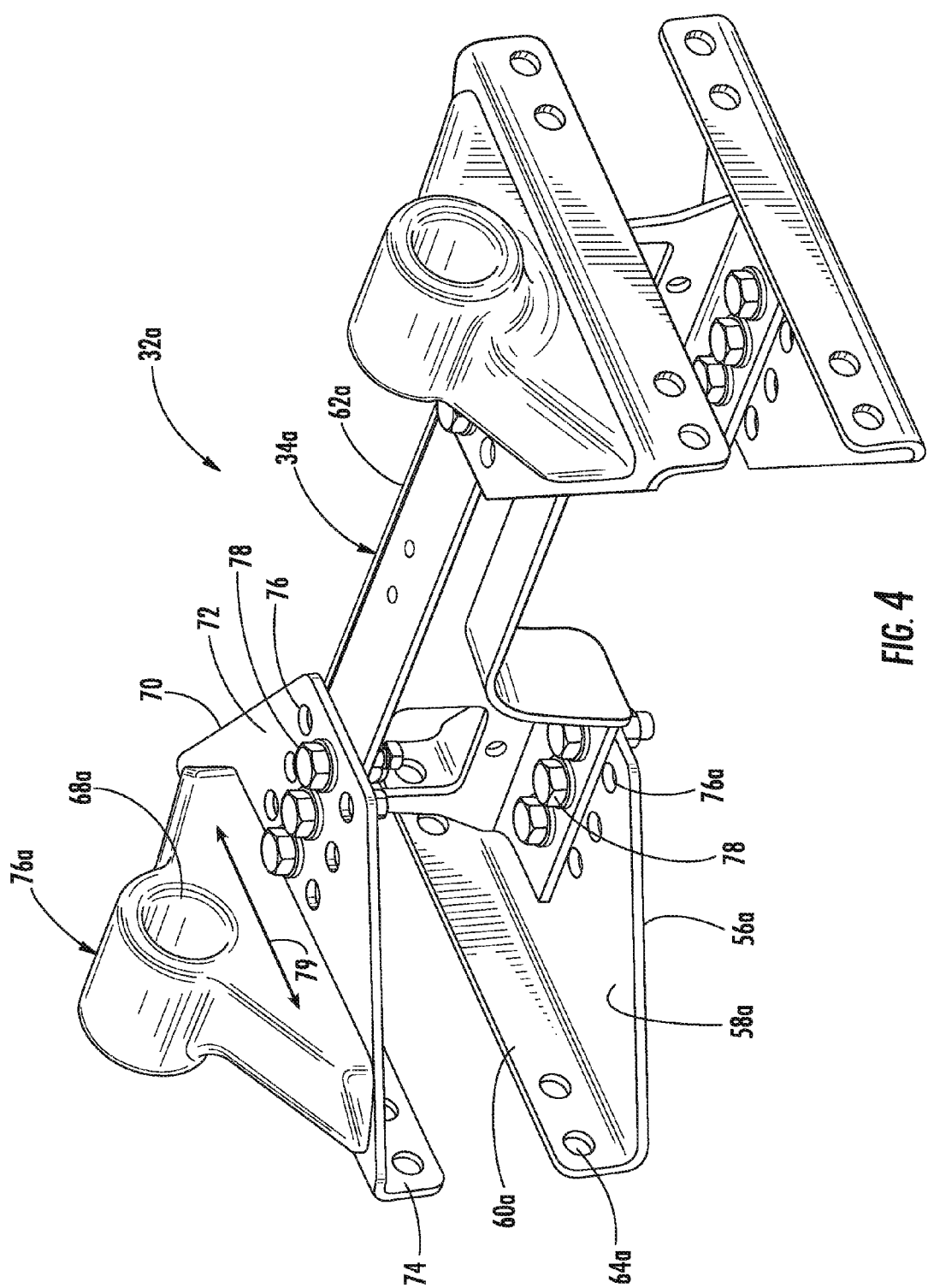
FIG. 4 is a perspective view of a second embodiment of the fifth wheel mounting assembly.
Figure 5:
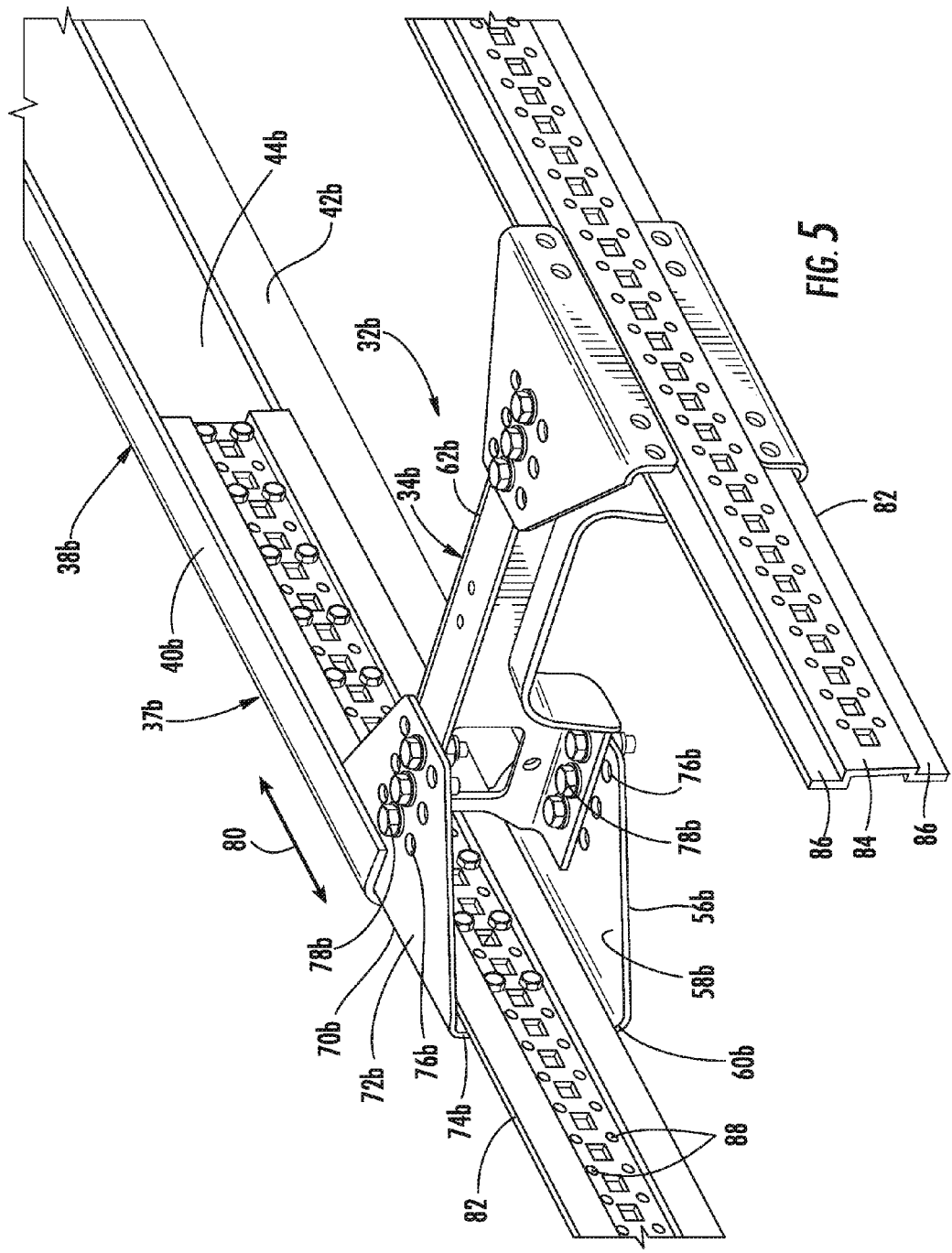
FIG. 5 is a perspective view of the second embodiment of the mounting assembly illustrated in assembly with frame members and rail members.
Figure 6:
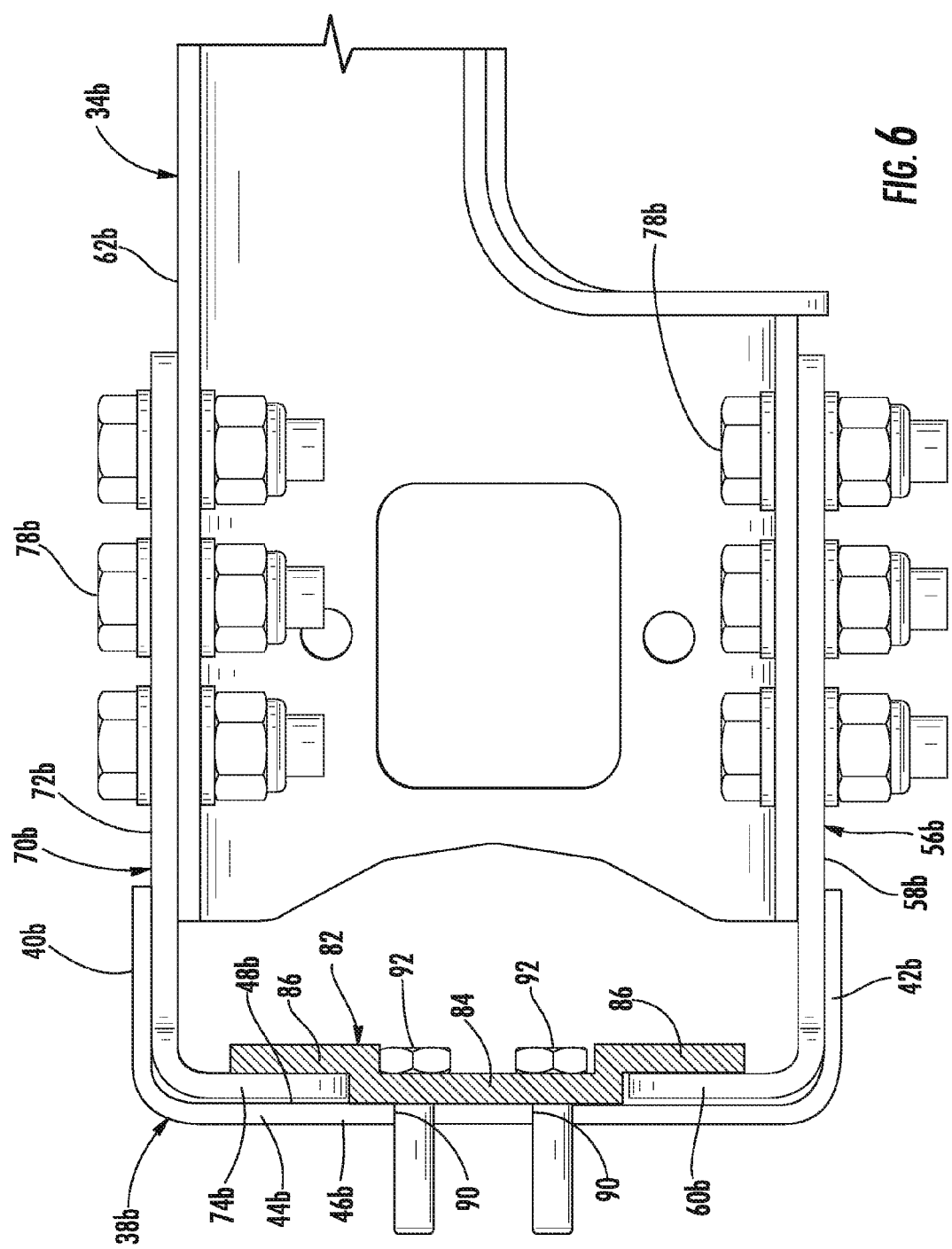
FIG. 6 is a partial end view of the second embodiment of the fifth wheel mounting assembly.
Figure 7A:
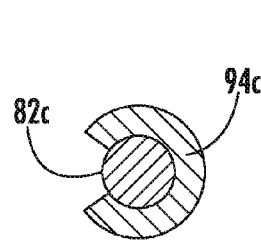
FIG. 7a is a cross-sectional end view of a first embodiment of a rail member and a carriage assembly of a fifth wheel mounting assembly.
Figure 7C:
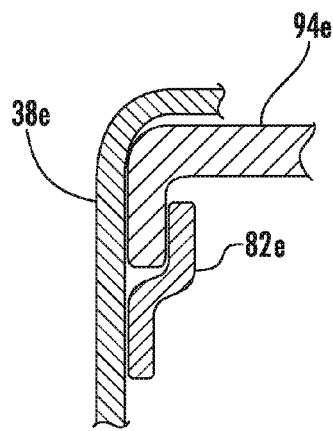
FIG. 7c is a cross-sectional end view of a third embodiment of a rail member and a carriage assembly.
Figure 7B:
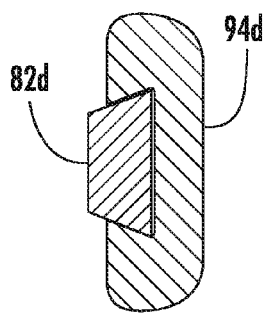
FIG. 7b is a cross-sectional end view of a second embodiment of a rail member and a carriage assembly.
Figure 7D:
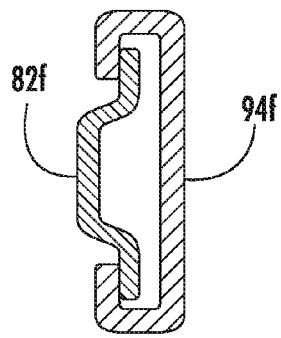
FIG. 7d is a cross-sectional end view of a fourth embodiment of a rail member and a carriage assembly.

The reference numeral 32b (FIGS. 5 and 6) generally designates another embodiment of the present invention, having a fifth wheel mounting assembly. Since the fifth wheel mounting assembly 32b is similar to the previously described fifth wheel mounting assembly 32a, similar parts appearing in FIG. 4 and in FIGS. 5 and 6 are respectively represented by the same, corresponding reference numeral, except for the suffix "b" in the numerals of the latter. In the illustrated example, the fifth wheel mounting assembly 32b includes a carriage assembly 34b that is longitudinally repositionable in a direction 80 relative to the associated frame rails 38b. The fifth wheel mounting assembly 32b is similar to the fifth wheel mounting assembly 32a previously described, with the most notable exception being the inclusion of a pair of rail members 82 that extend longitudinally along the vehicle frame rails 38b and are secured to the inwardly facing surface 48b of the vertical portion 44b of the corresponding frame rail 38b. Specifically, each rail member 82 is provided with a hat-shaped cross-sectional configuration and includes a planar body portion 84, and a pair of planar flange portions 86 juxtaposed across and extending longitudinally along the body portion 84, and inwardly offset therefrom. The body portion 84 includes a pair of rows of longitudinally offset apertures 88, while the frame rails 38b include a pair of longitudinally spaced apertures 90 each adapted to receive bolts 92 therein, thereby securing the rail members 82 to the associated frame rails 38b. In assembly, the flange 60b of each of the lower support members 56b and the flange 74b of each of the upper support members 70b are trapped between the inwardly facing surface 48b of the vertical portion 44b of the associated frame rail 38b and the flange portion 86 of the associated rail member 82, thereby securing the carriage assembly 34b at a particular location along the length of the vehicle frame rails 38b.

As best illustrated in FIGS. 7a-7f, the rail member and carriage assembly may be provided in various cooperating geometrical configurations. Specifically, the flange portions of the upper and lower support members of the carriage assembly may be replaced with various geometrical configurations that cooperate with corresponding configurations of the rail members. For example, each of the rail members 82c (FIG. 7a) may be provided with a circular cross-sectional configuration, and the flange portion of either of the upper or lower support members replaced with a C-shaped engagement portion 94c; a rail member 82d (FIG. 7b) having a trapezoidal cross-sectional configuration with a corresponding engagement portion 94d; a rail member 82e (FIG. 7c) having a Z-shaped cross-sectional configuration with an L-shaped engagement portion 94e; a rail member 82f (FIGS. 7d and 7e) cooperating with a C-shaped engagement portion 94f; and, cooperating rail member 82f (FIG. 7f) fixed to a vertical portion 44f of an associated frame member, and between which an engagement portion of a carriage assembly (not shown) is received.

Figure 3:
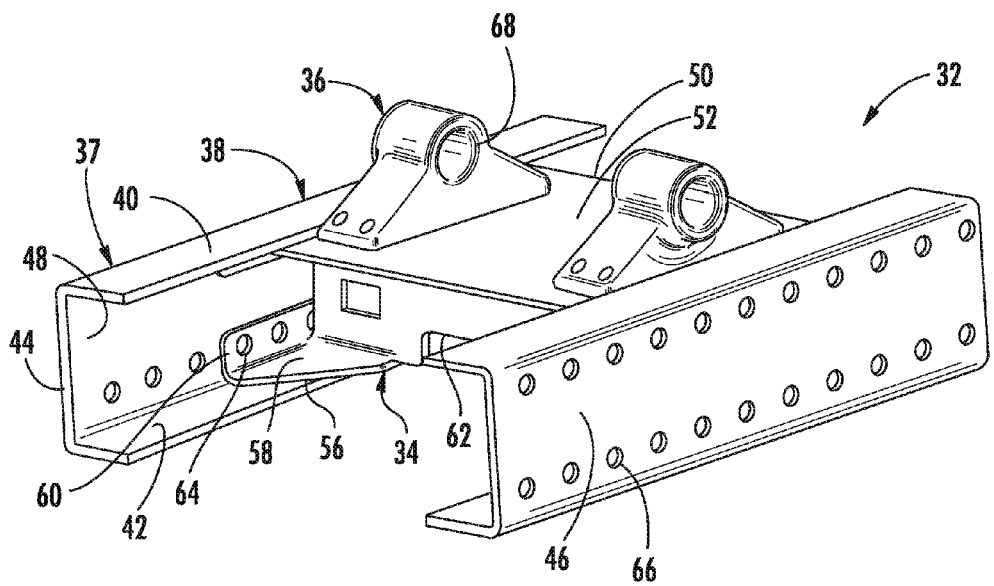
FIG. 3 is a perspective view of the first embodiment of the fifth wheel mounting assembly.
Figure 8:
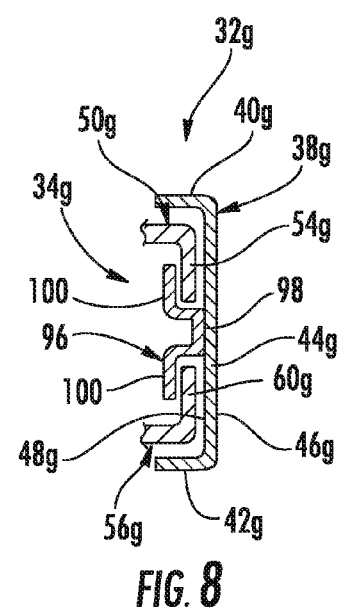
FIG. 8 is a partial perspective view of a third embodiment of the fifth wheel mounting assembly.
Figure 7E:
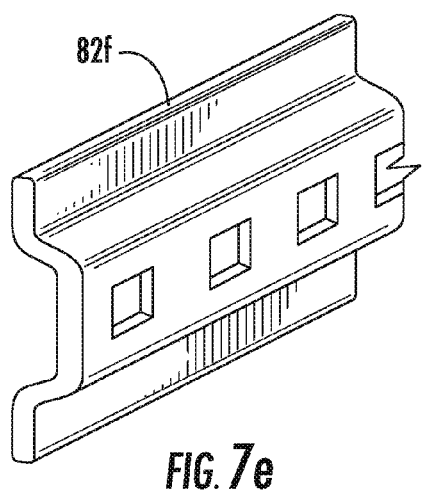
FIG. 7e is a partial perspective view of the fourth embodiment of the rail member.
Figure 7F:
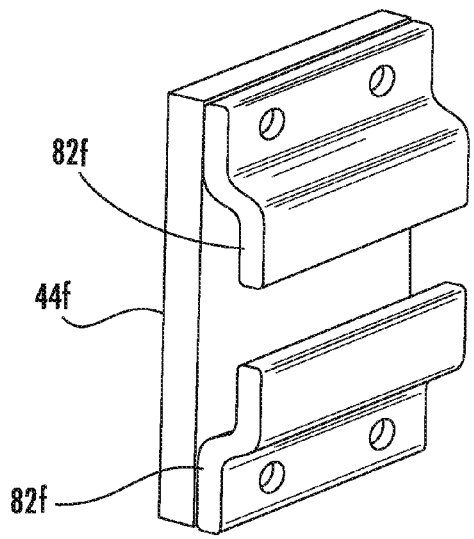
FIG. 7f is a partial perspective view of a fifth embodiment of a rail member secured to an associated vehicle frame rail.

The reference numeral 32g (FIG. 8) generally designates yet another embodiment of the present invention having a fifth wheel mounting assembly 32g. Since the fifth wheel mounting assembly 32g is similar to the previously described fifth wheel mounting assemblies 32, 32a, 32b, similar parts appearing in FIGS. 2-6 and in FIG. 8 are respectively represented by the same, corresponding reference numeral, except for the suffix "g" in the numerals of the latter. In the illustrated example, the fifth wheel mounting assembly 32g includes a carriage assembly 34g that includes an upper support member 50g and a lower support member 56g having flange 54g and flange 60g, respectively. An adaptor rail 96 extends longitudinally along the associated frame rail 38g and includes a body portion 98 and a pair of flange portions 100 that extend longitudinally along and are juxtaposed across the body portion 98, and are offset inwardly therefrom. In assembly, the body portion 98 of the adaptor rail 96 is secured to the inwardly facing surface 48g of the frame rail 38g and secures the carriage assembly 34g with respect to the associated frame rail 38f. The adaptor rail 96 may be used in conjunction with stationary systems, as illustrated in FIGS. 2-4, and longitudinally repositionable assemblies, as illustrated in FIGS. 5 and 6.

Figure 9:
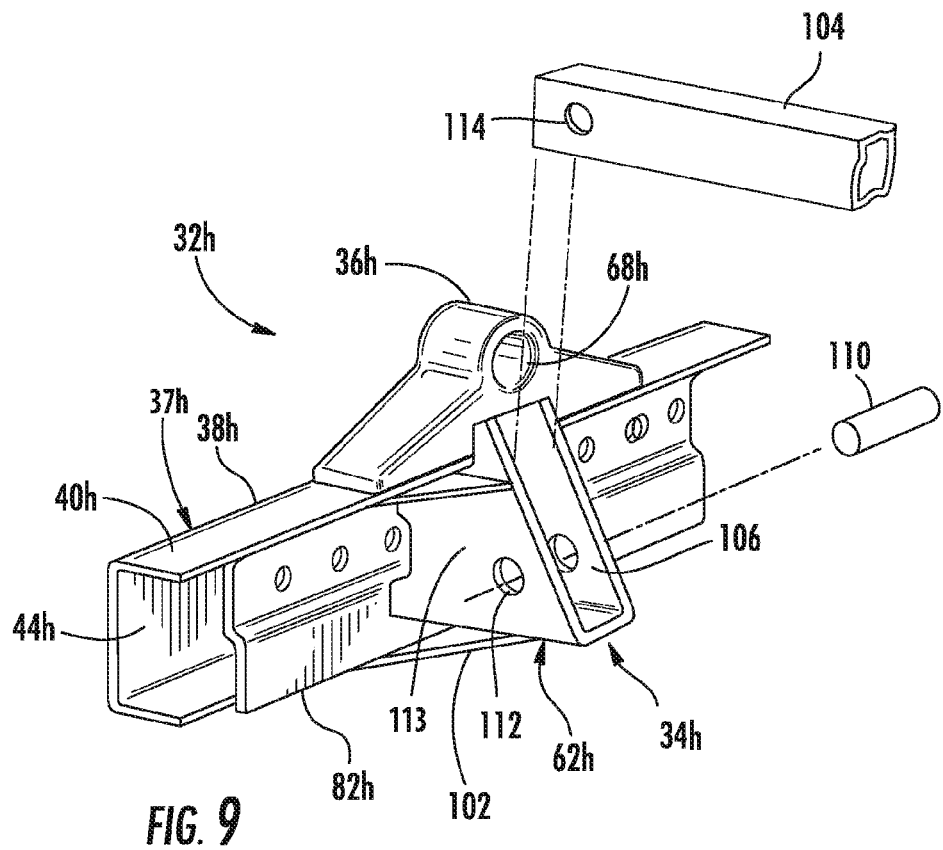
FIG. 9 is a partial perspective view of a fourth embodiment of the fifth wheel mounting assembly.

The reference numeral 32h (FIG. 9) generally designates another embodiment of the present invention having a fifth wheel mounting assembly. Since the fifth wheel mounting assembly 32h is similar to the previously described fifth wheel mounting assembly 32b, similar parts appearing in FIGS. 5 and 6 and in FIG. 9 are respectively represented by the same, corresponding reference numeral, except for the suffix "h" in the numerals of the latter. In the illustrated example, the carriage assembly 34h includes a multiple-piece cross member 62h of which end portion 102 and a center portion 104 is illustrated, and which is described in further detail below. The end portion 102 is configured to cooperate and couple with the associated rail member 82h. As illustrated, the mounting bracket 36h is secured to the end portion 102 of the cross member 62h such that the mounting bracket 36h is positioned vertically above the upper horizontal portion 40h of the associated frame rail 38h. Specifically, the cross member 62h includes a first end portion 102, a second end portion (not shown) and a center portion 104 extending between and secured to each of the end portions. Each of the end portions 102 include a receiving pocket 106 within which the distal ends of the center portion 104 are received. The distal ends of the center portion 104 are secured within the pocket 106 of each of the end portions 102 by separate or integrated fasteners. In the illustrated example, a separate fastener 110 is received within apertures 112 of sidewall 113 of the end portions 102 and apertures 114 of the center portion 104, thereby securing the center portion 104 to the end portions 102.

Figure 10:
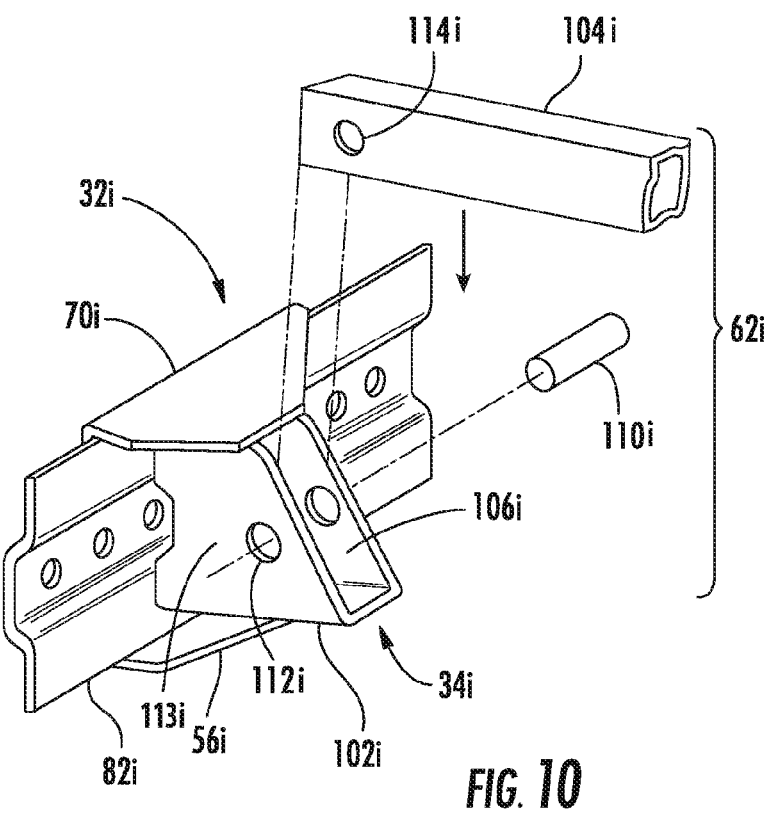
FIG. 10 is an exploded partial perspective view of a fifth embodiment of the fifth wheel mounting assembly.

The reference numeral 32i (FIG. 10) generally designates another embodiment of the present inventive fifth wheel mounting assembly. Since the fifth wheel mounting assembly 32i is similar to the previously described fifth wheel mounting assembly 32h, similar parts appearing in FIG. 9 and FIG. 10 are respectively represented by the same, corresponding reference numeral, except for the suffix "i" in the numerals of the latter. In the illustrated example, the fifth wheel mounting assembly 32i includes a carriage assembly 34i that includes a multiple-piece cross member 62i. The cross member 62i includes a first end portion 102i, a second end portion (not shown) and a center portion 104i extending between and secured to each of the end portions. Each of the end portions 102i include a receiving pocket 106i within which the distal ends of the center portion 104i are received. The distal ends of the center portion 104i are secured within the pocket 106i of each of the end portions 102i by separate or integrated fasteners. In the illustrated example, a separate fastener 110i is received within apertures 112i of the end portions 102i and apertures 114i of the center portion 104i, thereby securing the center portion 104i to the end portions 102i.

Figure 11:
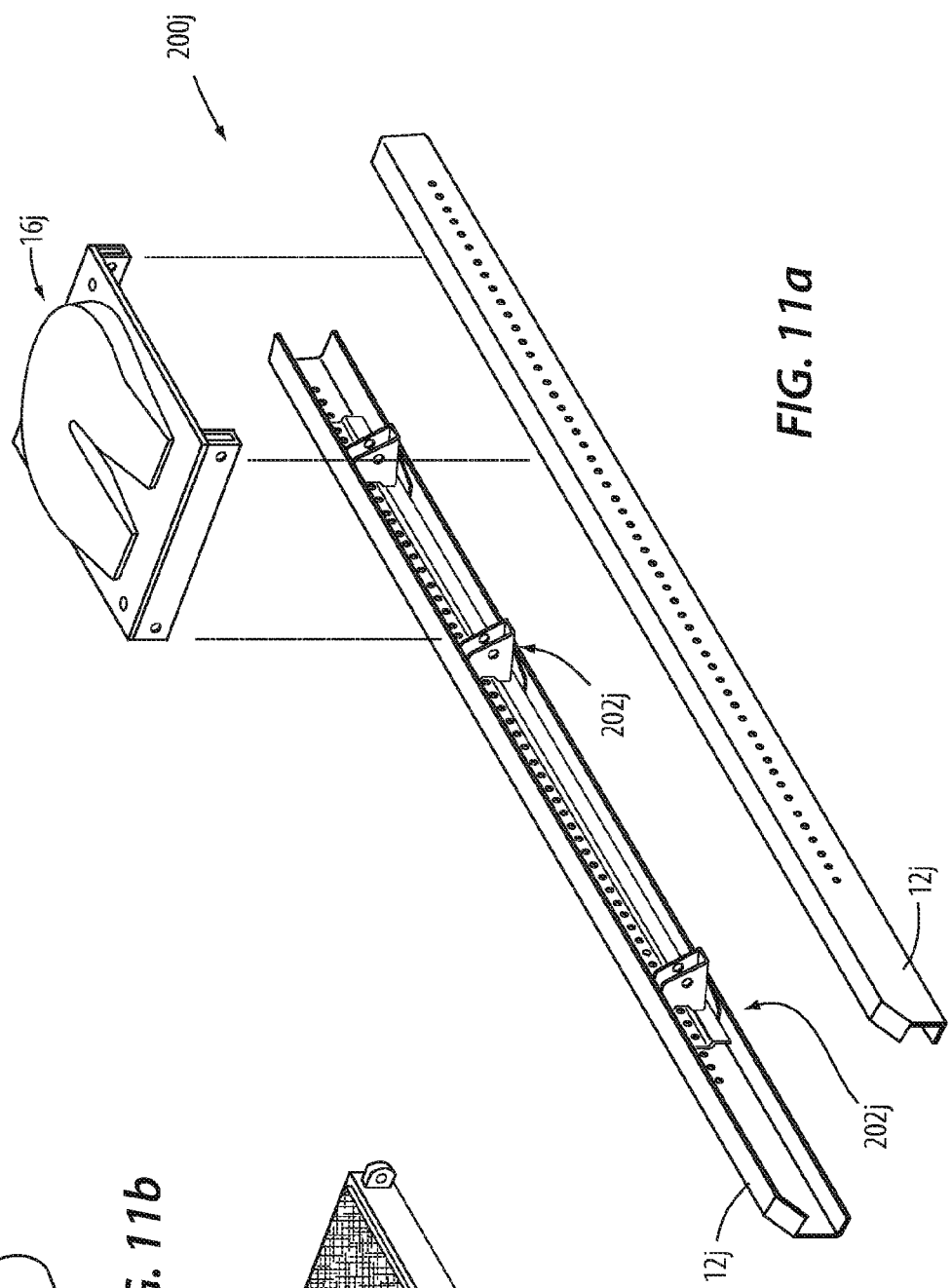
FIG. 11a is an explode perspective view of a vehicle accessory support grid system.
FIG. 11b is a perspective view of an air tank.
FIG. 11c is a perspective view of a catwalk.
Figure 12:
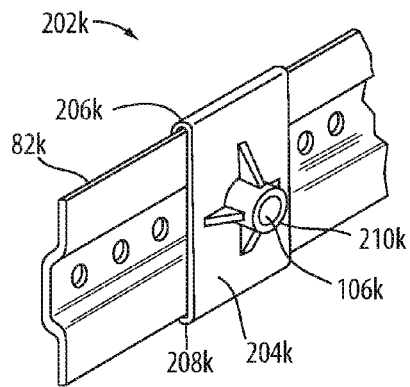
FIG. 12 is a perspective view of an alternative embodiment of a carriage assembly.
Figure 13:
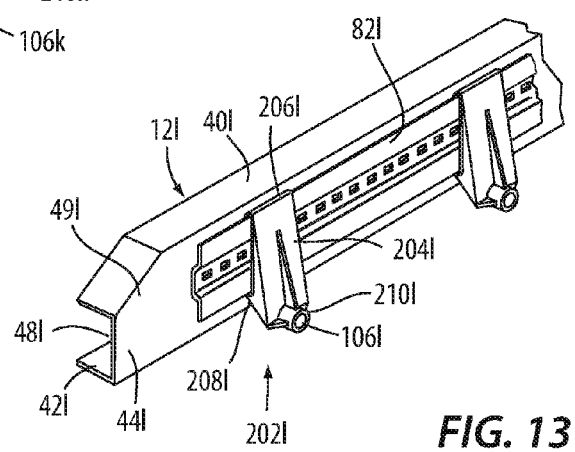
FIG. 13 is a perspective view of an alternative embodiment of a carriage assembly.

Each of the embodiments illustrated in FIG. 9 and FIG. 10 may be utilized to create a modular and adjustable vehicle accessory support grid system 200j (FIG. 11a) to support vehicle accessory arrangements, such as a fifth wheel coupling apparatus 16j, or other accessory arrangements as described below. In the illustrated examples, the support grid system 200j includes a plurality of carriage assemblies 202j similar in construction and configuration to the first end portion 102h of the cross member 62h and to the first end portion 102i of the cross member 62i. Other configurations for the carriage assembly may also be utilized depending upon the application and the geometrical configuration of the vehicle frame rails and the rail member, examples of which are illustrated in FIGS. 7a-7f and described above. Examples of other potential configurations include the carriage assembly 202k (FIG. 12) that includes a body portion 204k having an upwardly located and downwardly opening, C-shaped flange 206k, and a downwardly located and upwardly opening, C-shaped flange 208k wrapped about corresponding flanges of the rail member 82k. The carriage assembly 202k further includes a circularly shaped receiving pocket 106k defined within an inwardly-extending support boss 210k fixedly attached to the body portion 204k. Another example includes the carriage assembly 202l (FIG. 13) that includes a body portion 204l and flanges 206l, 208l similar to the body portion 204k and the flanges 206k, 208k described above, with the body portion 204l downwardly elongated such that the support boss 210l and receiving pocket 106l are positioned substantially below the vehicle frame rail 121 and the rail member 82l. It is noted that the rail member 82l is attached to an outwardly-facing surface 491 of the associated vehicle frame rail 121, thereby allowing variously vehicle component arrangements to be supported outside of the space between the vehicle frame rails.

Figure 14A:
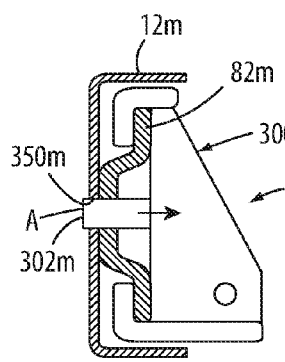
FIG. 14a is an end view of a locking assembly or arrangement illustrated in a locked position.
Figure 14B:
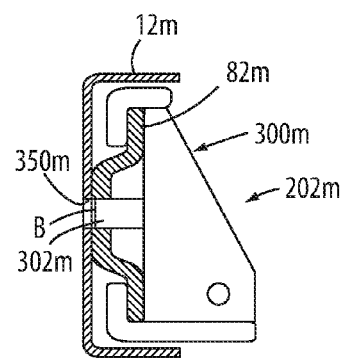
FIG. 14b is an end view of the locking assembly or arrangement illustrated in an unlocked position.
Figure 14C:
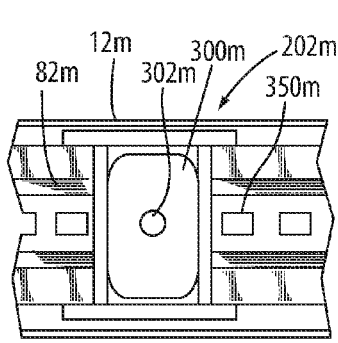
FIG. 14c is a side view of the locking assembly or arrangement.
Figure 15:
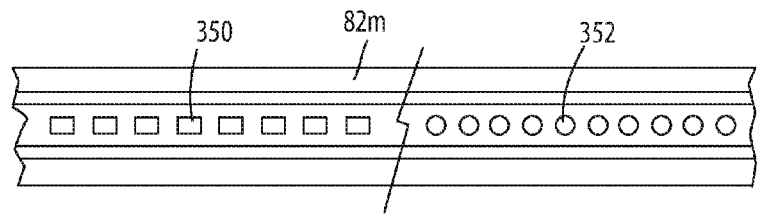
FIG. 15 is a side view of embodiments of a support rail.

The variously configured carriage assemblies include positional locks that lock the carriage assembly at a selected position along the length of the associated rail member. For example, the carriage assembly may include a retractable pin lock 300m (FIGS. 14a-14c) which may be spring biased towards an engaged position. The pin lock 300m, or alternatively configured locking arrangement, selectively engages the square-shaped 350 (FIG. 15) or round-shaped 352 apertures of the support rail, although alternatively configured apertures may be utilized. In the illustrated example, the pin lock 300m includes a pin member 302m moveable between a locked position A (FIG. 14a), wherein the pin member 302m engages a selected aperture 350m and locks the carriage assembly 202m at a selected position along the length of the rail member 82m, and an unlocked position B (FIG. 14b), wherein the pin member 302m is retracted from engagement with any of the apertures 350m and the carriage assembly 202m is free to slide along the length of the rail member 82m. Alternatively, the locking assembly may include a clamping arrangement 360n (FIG. 16) that utilizes an applied friction to clamp the locking assembly to the support rail 82n at a position along the length of the support rail 82n without engaging an aperture within the support rail, thereby providing infinite adjustability and positioning of the supported vehicle accessory along the length of the vehicle frame. In the illustrated example, the clamping arrangement 360n includes a brake pad member 362n attached to an actuator portion 364n that is threadably received with the body portion 204n of the carriage assembly 202n such that actuation of the actuator portion 364n causes the brake pad member 362n to abut the rail member 82n and exert a force F thereon, thereby locking the carriage assembly 202n at a selected position along the length of the rail member 82n. In an alternative embodiment, the clamping arrangement 360o (FIG. 17) that includes a brake pad member 362o attached to an actuator portion 364o that is threadably received with the carriage assembly 202o such that actuation of the actuator portion 364o causes the brake pad member 362o to abut an inwardly-extending flange 370o at the T-shaped rail member 82o and exert a force F' thereon, thereby locking the carriage assembly 202o at a selected position along the length of the rail member 82o. It is noted that the threadable actuation of the actuation portions 364n, 364o may be replaced with sliding, pivoting, or other actuations, and that each actuation may be pneumatically, hydraulically and/or mechanically driven.

As noted above, the vehicle accessory support grid system 200j may be utilized to support numerous and variously configured vehicle accessory arrangements at selected positions along the length of the vehicle frame rails. For example, the accessory support grid system 200j (FIG. 11a) may be utilized to support vehicle accessories such as the fifth wheel coupling apparatus 16j, an air tank 400 (FIG. 11b), catwalks 402 (FIG. 11c), engine mounts (not shown), cab connections/mounts (not shown), mud flaps (not shown), and the like. It is noted that the vehicle accessory support grid system 200j may also be utilized within trailer assemblies to support arrangements typically associated therewith, such as trailer suspension components, loading ramps, and the like. Further, the support rails may extend along the full length of the associated vehicle frame rails or only selected lengths thereof. Moreover, additional vehicle components may be supported by the support rails to increase the utility of the same. For example, hydraulic, control, air, electrical lines may be supported from the support rails 82p (FIG. 18) by supporting fasteners such as push-in clips 500p. In the illustrated example, the push-in clip 500p includes an engagement portion 502p having a Christmas-tree type configuration for pushably engaging an aperture 352p of the support rail 82p, and a support portion 504p adapted to detachably couple to the lines noted above.

In assembly, the carriage assemblies 202j may be positioned along the length of the vehicle frame rails 12j. The carriage assemblies 202j may then be locked into position along the length of the frame rails 12 by one of the various locking assemblies as described. The configuration of the carriage assemblies 202j allows one of the variously described vehicle accessory arrangements to be coupled to the carriage assemblies 202j subsequent to the carriage assemblies 202j being positioned along the support rails and locked thereto. The inventive configuration of the vehicle accessory support grid system provides increased flexibility in the use of the support system and reduces the significant number of specially produced components necessary to support and couple vehicle accessories to the diversely dimensioned and configured heavy duty truck and trailer frame configurations currently available on the market.

In the foregoing description, it will be readily appreciated by those skilled in the art that modifications may be made to the invention without departing from the concepts as disclosed herein. Such modifications are to be considered as included in the following claims, unless these claims by their express language state otherwise.

The invention claimed is:

1. A fifth wheel mounting assembly for mounting a fifth wheel hitch plate to a vehicle frame assembly including a first frame member and a second frame member, the fifth wheel mounting assembly comprising:
   a first support member adapted to couple to the first frame member of the vehicle frame assembly;
   a second support member adapted to couple to the second frame member of the vehicle frame assembly; and
   a support assembly comprising:
      a first portion slidably engaging the first support member and adjustable along a length of the first support member, the first portion including an upwardly-opening recess;
      a first mounting member coupled to the first portion and configured to pivotably support the fifth wheel hitch plate;
      a second portion slidably engaging the second support member and adjustable along a length of the second support member, the second portion including an upwardly-opening recess;
      a second mounting member coupled to the second portion and configured to pivotably support the fifth wheel hitch plate; and
      a center portion having a first end received within the upwardly-opening recess of the first portion and a second end received within the upwardly-opening recess of the second portion, wherein the upwardly-opening recess of the first portion and the upwardly-opening recess of the second portion are configured to receive the ends of the center portion subsequent to the first mounting member being coupled to the first support member and the second mounting member being coupled to the second support member.

2. The fifth wheel mounting assembly of claim 1, wherein the upwardly-opening recess of the first portion includes a pair of side walls, and wherein the upwardly-opening recess of the second portion includes a pair of sidewalls.

3. The fifth wheel mounting assembly of claim 2, wherein the first end of the center portion is secured to the first portion and the second end of the center portion is secured to the second portion by mechanical fasteners.

4. The fifth wheel mounting assembly of claim 3, wherein the mechanical fasteners are received within apertures located within the pair of sidewalls of the first portion and the pair of sidewalls of the second portion.

5. The fifth wheel mounting assembly of claim 1, wherein at least a portion of the center portion is positioned vertically lower than the first mounting member, and wherein at least the portion of the center portion is positioned vertically lower than the second mounting member.

6. The fifth wheel mounting assembly of claim 5, wherein the center portion is entirely positioned vertically lower than the first mounting member, and wherein the center portion is entirely positioned vertically lower than the second mounting member.

7. The fifth wheel mounting assembly of claim 1, wherein at least a portion of the center portion is configured to be positioned vertically lower than an uppermost surface of the first frame member, and wherein at least the portion of the center portion is configured to be positioned vertically lower than an uppermost surface of the second frame member.

8. The fifth wheel mounting assembly of claim 7, wherein the center portion is configured to be entirely positioned vertically lower than the uppermost surface of the first frame member, and wherein the center portion is configured to be entirely positioned vertically lower than the uppermost surface of the second frame member.

9. A fifth wheel mounting assembly for mounting a fifth wheel hitch plate to a vehicle frame assembly including a first frame member and a second frame member, the fifth wheel mounting assembly comprising:
   a first support member adapted to couple to the first frame member of the vehicle frame assembly;
   a second support member adapted to couple to the second frame member of the vehicle frame assembly; and
   a support assembly comprising:
      a first portion slidably engaging the first support member and adjustable along a length of the first support member, the first portion including an upwardly-opening recess;
      a first mounting member coupled to the first portion and configured to pivotably support the fifth wheel hitch plate;
      a second portion slidably engaging the second support member and adjustable along a length of the second support member, the second portion including an upwardly-opening recess;
      a second mounting member coupled to the second portion and configured to pivotably support the fifth wheel hitch plate; and
      a center portion having a first end received within the upwardly-opening recess of the first portion and a second end received within the upwardly-opening recess of the second portion, wherein the first mounting member is outwardly-horizontally spaced from the first end of the center portion and the second mounting member is outwardly-horizontally spaced from the second end of the center portion.

10. The fifth wheel mounting assembly of claim 9, wherein the upwardly-opening recess of the first portion includes a pair of side walls, and wherein the upwardly-opening recess of the second portion includes a pair of sidewalls.

11. The fifth wheel mounting assembly of claim 10, wherein the first end of the center portion is secured to the first portion and the second end of the center portion is secured to the second portion by mechanical fasteners.

12. The fifth wheel mounting assembly of claim 11, wherein the mechanical fasteners are received within apertures located within the pair of sidewalls of the first portion and the pair of sidewalls of the second portion.

13. The fifth wheel mounting assembly of claim 9, wherein at least a portion of the center portion is positioned vertically lower than the first mounting member, and wherein at least the portion of the center portion is positioned vertically lower than the second mounting member.

14. The fifth wheel mounting assembly of claim 13, wherein the center portion is entirely positioned vertically lower than the first mounting member, and wherein the center portion is entirely positioned vertically lower than the second mounting member.

15. The fifth wheel mounting assembly of claim 9, wherein at least a portion of the center portion is configured to be positioned vertically lower than an uppermost surface of the first frame member, and wherein at least the portion of the center portion is configured to be positioned vertically lower than an uppermost surface of the second frame member.

16. The fifth wheel mounting assembly of claim 15, wherein the center portion is configured to be entirely positioned vertically lower than the uppermost surface of the first frame member, and wherein the center portion is configured to be entirely positioned vertically lower than the uppermost surface of the second frame member.

17. A method for mounting a fifth wheel mounting assembly to a vehicle frame assembly that includes a first frame member and a second frame member, the method comprising:
   providing a first support member;
   coupling the first support member to the first frame member of the vehicle frame assembly;
   providing a second support member;
   coupling the second support member to the second frame member of the vehicle frame assembly;
   providing a support assembly that includes a first portion that slidably engages the first support member and is adjustable along a length of the first support member and includes a a first recess, the first portion having the first recess being an upwardly-opening recess, a second portion that slidably engages the second support member and is adjustable along a length of the second support member and includes a second recess, and a center portion having a first end and a second end;
   coupling a first mounting member to the first portion, the first mounting member configured to pivotably support a fifth wheel hitch plate;
   coupling a second mounting member to the second portion, the second mounting member configured to pivotably support the fifth wheel hitch plate;
   coupling the center portion of the support assembly with the first portion of the support assembly by positioning the first end of the center portion within the first recess subsequent to the first mounting member being coupled to the first portion; and
   coupling the center portion of the support assembly with the second portion of the support assembly by positioning the second end of the center portion within the second recess subsequent to the second mounting member being coupled to the second portion.

18. The method of claim 17, wherein the first recess of the first portion and the second recess of the second portion are each upwardly-opening.

19. The method of claim 17, wherein the step of coupling the center portion of the support assembly with the first and second portions of the support assembly includes coupling the center portion with the first and second portions by a plurality of mechanical fasteners that engage the center portion and the first and second portions.

\* \* \* \* \*

UNITED STATES PATENT AND TRADEMARK OFFICE
CERTIFICATE OF CORRECTION

PATENT NO. : 9,656,702 B2
APPLICATION NO. : 14/445739
DATED : May 23, 2017
INVENTOR(S) : Justin D. Keatley Page 1 of 2

It is certified that error appears in the above-identified patent and that said Letters Patent is hereby corrected as shown below:

In the Specification

Column 1, Line 21:
"position" should be — positions —

Column 1, Line 45:
"includes" should be — include —

Column 1, Line 65:
"requires" should be — require —

Column 2, Line 48:
"a" should be — the —

Column 3, Line 17:
"porting" should be — portion —

Column 3, Line 40:
"a" should be — the —

Column 3, Line 63:
After "including" delete ","

Column 5, Line 5:
"explode" should be — exploded —

Column 6, Lines 32-33, 37:
"cross member" should be — cross-member —

Signed and Sealed this
Thirty-first Day of July, 2018

Andrei Iancu
*Director of the United States Patent and Trademark Office*

CERTIFICATE OF CORRECTION (continued)
U.S. Pat. No. 9,656,702 B2

Column 7, Line 45:
"38f" should be — 38g —

Column 7, Line 58, 63, 66:
"cross member" should be — cross-member —

Column 8, Lines 21, 22, 42, 43:
"cross member" should be — cross-member —

Column 8, Line 63:
"121" should be — 12l —

Column 8, Line 65:
"491" should be — 49l —

Column 8, Line 65:
"121" should be — 12l —

Column 8, Line 66:
"variously" should be — various —

Column 9, Line 8:
"350" should be — aperture 350m —

Column 10, Line 8:
"12" should be — 12j —

In the Claims

Column 11, Claim 10, Line 65:
"sidewalls" should be — side walls —

Column 12, Claim 12, Lines 5, 6:
"sidewalls" should be — side walls —

Column 12, Claim 17, Line 43:
Delete "a"